C. F. CARSON.
CATTLE POKE.
APPLICATION FILED JUNE 15, 1917.
1,252,882. Patented Jan. 8, 1918.
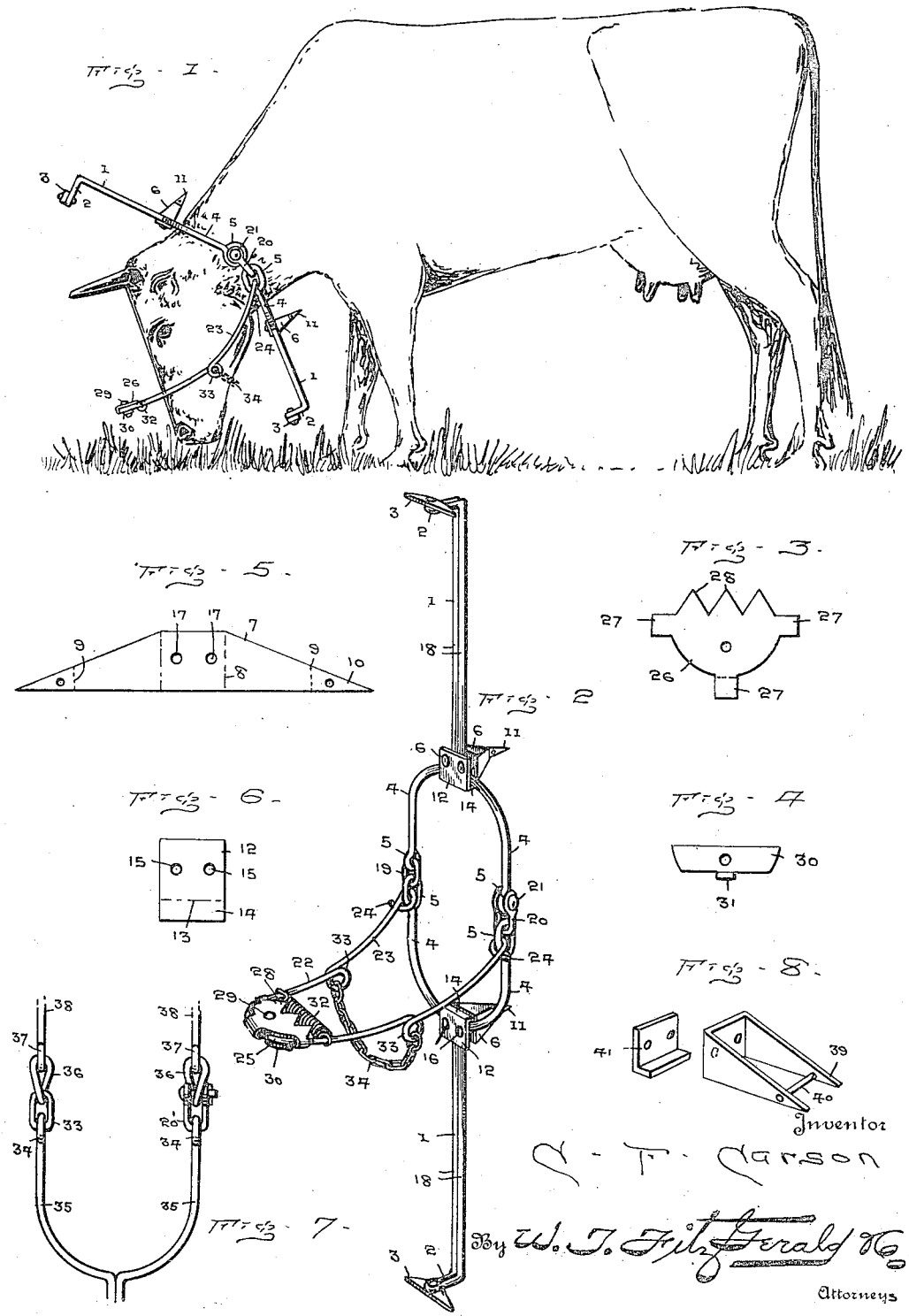

UNITED STATES PATENT OFFICE.

CARL F. CARSON, OF FAXON, OKLAHOMA.

CATTLE-POKE.

1,252,882.  Specification of Letters Patent.  Patented Jan. 8, 1918.

Application filed June 15, 1917. Serial No. 174,959.

*To all whom it may concern:*

Be it known that I, CARL F. CARSON, a citizen of the United States, residing at Faxon, in the county of Comanche and State of Oklahoma, have invented certain new and useful Improvements in Cattle-Pokes; and I do hereby declare the following to be a full, clear, and exact description of the invention, such as will enable others skilled in the art to which it appertains to make and use the same.

This invention relates to new and useful improvements in cattle pokes, and has for its primary object to provide one which when arranged in position upon the head of a cow or other bovine animal will operate should the animal attempt to force its head through a fence to force sharp spurs into its flesh and thereby serve to prevent any further attempt on the part of the animal to get through the fence.

Another object of the invention is to provide a cattle poke of the above-stated character which will be of comparatively cheap and inexpensive construction and which can be quickly and readily placed in position upon the head of an animal.

A further object of the invention is to provide the outwardly extending arms of the device with cross bars which are adapted to engage the longitudinally extending wires of a fence should the animal attempt to insert its head through between the wires sidewise.

A still further object of the invention is to so construct the device that it will rest comfortably upon the head of the animal and be so constructed and balanced that the downwardly extending arm of the device will be prevented from striking the jaws of the animal as it moves about over the ground.

With these and other objects in view as will appear as the description proceeds, the invention comprises the various novel features of construction, combination and arrangement of parts as will be more fully described hereinafter and set forth with particularity in the appended claims.

Referring to the drawings,

Figure 1 is a side elevation of my improved cattle poke shown arranged in position upon the head of a cow.

Fig. 2 is a detail perspective view of the device.

Fig. 3 is a plan view of the nose plate blank.

Fig. 4 is a plan view of the bearing plate to which the nose plate is adapted to be secured.

Fig. 5 is a plan view of one of the spur blanks.

Fig. 6 is a plan view of one of the spur attaching members.

Fig. 7 is a fragmentary view of a different form of device showing means for adjustably connecting the ends of the upper fork member with the ends of the lower fork member, and Fig. 8 is a detail perspective view of a modified form of spur and spur attaching plate.

Similar characters of reference are used to denote corresponding parts throughout the accompanying drawings and the following description.

Referring more particularly to the drawings, my improved cattle poke is shown to consist of a pair of upper and lower fork members, each of which is constructed of a single rod bent medially upon itself. Each of the upper and lower fork members will be seen to consist of an arm 1 which is provided at its outer end with a right angular extension 2 and to which is attached a cross bar 3 having its opposite ends pointed. The inner end of each fork member embodies a pair of arms 4, the terminal ends of each of which are provided with eyes 5.

Each of the fork members is provided with a spur 6 at the point where the arm 1 connects with the arms 4. Each of the spurs is formed from a blank 7, as shown in Fig. 5, and is bent upon the dotted lines 8 and 9 into triangular form, the opposite pointed ends 10 being extended in parallel relation and are riveted together to provide a flesh engaging spur 11. Each of the triangular spur members 6 is adapted to be attached to the fork member through the medium of a spur attaching member 12 which is bent upon the dotted line 13 to provide a right angular flange 14 that is adapted to overlie the inner surfaces of the prongs. Each attaching member 12 is provided with a pair of apertures 15 through which are passed securing bolts or other suitable fastening devices 16, the inner ends of which are engaged through the apertures 17 in the triangular spur 6. As shown, the bolts 16 are arranged on opposite sides of the arm 1 and serve to not only attach the spur 6 to the fork member but also to prevent the arms 4 which are integral with the rods 18 forming the arm 1 from separating.

One arm of each upper and lower fork member is hingedly connected together by a link 19 while the other prong of each upper and lower fork member is detachably connected together by a clevis 20 through the medium of a bolt 21. By this construction, it will be apparent that when the bolt 21 is removed, the fork members can be swung open upon the connecting link 19 to position them around the animal's neck, after which they can be again secured in position by the bolt 21, the latter being securely retained in position by a cotter pin.

The reference numeral 22 represents a forked head member and is shown to embody a pair of arms 23 which have their terminal ends coiled through the eyes 5 of the lower fork member and then extended laterally and outwardly as at 24 between the arms 23 and the arms 4 of the lower fork member, these outwardly extending portions 24 serving to support the head member adjacent to the lower fork member.

The forward portions of the arms 23 are connected by a curved end 25 over which is positioned a nose plate 26. In Fig. 3 will be seen a view of the nose plate blank, which is shown to embody radially projecting tongues 27 which are bent downwardly and around the curved end 25 and the arms 23. The inner edge of the nose plate 26 is provided with teeth or serrations 28 that are adapted to engage the nose of the animal should it attempt to force its head through a fence. The nose plate 26 is additionally secured in position by a bolt 29 which is extended through it and connected to a bearing plate 30 positioned on the under side of the curved end portion 25, this bearing plate 30 having an upstanding lug 31 which projects upward within the curved end portion 25 and serves to prevent lateral casual movement of the bearing plate.

In order to prevent the teeth 28 from normally engaging the nose of the animal, a yieldable guard 32, such as a coil spring, is positioned directly in rear of the teeth and has its terminal ends attached to the arms 23. Each arm 23 is coiled intermediate its ends to provide an eye 33 and connected to these eyes 33 is a jaw chain 34.

It is to be understood that in the construction of the device, the forked head member is to be of such a weight as will counterbalance the weight of the lower forked member, so that when the device is arranged in position upon the head of the animal, this forked head member will counterbalance and operate to hold the lower fork member out of engagement with the jaws of the animal and will at the same time prevent the lower fork member from bumping or striking the jaws of the animal during its movements over the ground.

By the provision of the jaw chain 34, the animal will be prevented from in any manner kicking or striking the lower fork member and forcing the head member upwardly upon its head to an unnatural position.

In the operation of the device, it will be manifest that should the animal attempt to force its head through a fence, the outwardly extending arms 1 of the upper and lower fork members will engage the fence and be moved rearwardly by the forward movement of the animal so that the spurs 6 carried by the upper and lower fork member will be forced into the flesh of the animal, and at the same time the teeth 28 of the nose plate will be forced into the animal's nose, thus serving to effectively prevent the animal from making any further attempt to go through the fence. By virtue of the cross bars 3 on the upper ends of the arms 1, it will be apparent that they will serve to effectively prevent the animal from inserting its head through between the longitudinal wires of a fence sidewise.

In Fig. 7 the lower fork member is shown adjustably connected to the upper fork member through the medium of a clevis 20' and a split or lap link 33. The clevis 20' and the lap link 33 are positioned through the eyes 34 formed on the upper ends of the arms 35 of the lower fork member. The lap link 33 and the clevis 20' are adjustably connected to twisted links 36 which are in turn connected to the eyes 37 formed on the lower ends of the arms 38 of the upper fork member.

Should it be desired to reduce the opening between the upper and lower fork members, the lap link 33 and the clevis 20' can be disconnected from the twisted links 36 and connected to the eyes 37 of the upper fork member. From this construction it will be noted that the neck opening between the fork members can be either increased or decreased in size by adding or subtracting from the number of twisted links.

In Fig. 8 I have shown another form of spur which is formed from a single sheet of metal, which is bent into substantially U-shape and has its terminal ends 39 connected by a bolt or rod 40. The bolt 40 not only serves to connect the points or terminal ends of the spur but also serves to limit the penetrating depth of the points, should the animal wearing the poke surge against a fence or some other object. This form of spur is, like the spur 5 previously described, attached to the upper and lower fork members through the medium of an attaching plate 41.

I claim:—

1. A cattle poke comprising a pair of upper and lower fork members, each fork member embodying an arm having a pair of arms at one end, a cross bar carried by the outer end of each arm, means for connecting the ends of said arms together, a forked head member attached to said lower fork member, means for supporting said head member from said lower fork member, a nose plate carried by said head member, and a spur carried by each upper and lower fork member.

2. A cattle poke comprising a pair of upper and lower fork members, each fork member embodying an arm having a pair of arms, means for connecting the ends of said arms together, a forked head member attached to said lower fork member, means to hold said head member from said lower fork member, a toothed nose plate carried by said head member, a yieldable guard carried by said head member and arranged in advance of said toothed nose plate, a jaw chain connected across said forked head member, and a spur carried by each arm of said upper and lower fork members.

3. A cattle poke comprising upper and lower fork members, each embodying an arm having a pair of arms at one end, the ends of which are each provided with an eye, a link connecting one arm of each upper and lower fork member together, a forked head member embodying a pair of arms having their terminal ends coiled through the eyes of the arms of said lower fork member and then extended laterally between said head arms and the arms of said lower member and serving to support said head member from said lower member, a nose engaging plate carried by said head member, a yieldable guard for said nose plate, a jaw chain connected to said head arms, and a spur carried by each upper and lower fork member.

4. A cattle poke comprising upper and lower fork members, each fork member embodying an arm having one end provided with a pair of arms, a cross bar carried by the outer end of each arm, means for connecting the ends of the arms of the upper member to the ends of the arms of the lower member, a forked head member attached to said lower fork member, means for supporting said head member from said lower fork member, a nose engaging element carried by said head member, a jaw chain carried by said head member, and flesh engaging elements carried by each of said upper and lower fork members, said forked head member adapted to counterbalance said lower fork member and prevent the latter from striking the jaws of the animal.

5. A cattle poke comprising upper and lower fork members, each fork member embodying an arm having one end provided with a pair of arms, a cross bar carried by the outer end of each arm, means for adjustably connecting the ends of the arms of the upper member to the ends of the arms of the lower member, a forked head member attached to said lower fork member, means for supporting said head member from said lower fork member, a nose engaging element carried by said head member, a flexible jaw element carried by said head member, and flesh engaging elements carried by each of said upper and lower fork members, said forked head member adapted to counterbalance said lower fork member and prevent the lower fork member from striking the jaws of the animal.

In testimony whereof I have signed my name to this specification in the presence of two subscribing witnesses.

CARL F. CARSON.

Witnesses:
W. E. BOTKIN,
W. O. MORRISON.

Copies of this patent may be obtained for five cents each, by addressing the "Commissioner of Patents, Washington, D. C."